(12) United States Patent
Watson et al.

(10) Patent No.: US 7,595,573 B2
(45) Date of Patent: Sep. 29, 2009

(54) SUBMERSIBLE ELECTRIC MOTOR TERMINATED FOR AUXILIARY TOOLS

(75) Inventors: Arthur I. Watson, Sugar Land, TX (US); Michael Hui Du, Pearland, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 621 days.

(21) Appl. No.: 11/531,951

(22) Filed: Sep. 14, 2006

(65) Prior Publication Data
US 2007/0296291 A1 Dec. 27, 2007

Related U.S. Application Data

(60) Provisional application No. 60/805,607, filed on Jun. 23, 2006.

(51) Int. Cl.
*H02K 5/132* (2006.01)
*F04D 13/08* (2006.01)

(52) U.S. Cl. .................. 310/87; 310/71; 417/423.3

(58) Field of Classification Search .................. 310/71, 310/87; 417/414, 423.3
See application file for complete search history.

(56) References Cited

U.S. PATENT DOCUMENTS

| | | | | |
|---|---|---|---|---|
| 2,233,672 A | | 3/1941 | Mason | |
| 2,674,194 A | * | 4/1954 | Arutunoff | 417/414 |
| 3,041,977 A | * | 7/1962 | Boyd | 417/414 |
| 3,604,964 A | * | 9/1971 | Conrad et al. | 310/71 |
| 4,040,773 A | | 8/1977 | Tuzson | |
| 4,578,608 A | * | 3/1986 | Mech et al. | 310/112 |
| 5,286,220 A | * | 2/1994 | Watson | 439/589 |
| 5,628,616 A | | 5/1997 | Lee | |
| 5,994,808 A | * | 11/1999 | Gross et al. | 310/87 |
| 6,464,004 B1 | | 10/2002 | Crawford et al. | |
| 6,599,091 B2 | | 7/2003 | Nagle | |
| 6,666,664 B2 | * | 12/2003 | Gross | 417/423.3 |
| 6,700,252 B2 | * | 3/2004 | Fleshman et al. | 310/87 |
| 7,400,074 B2 | * | 7/2008 | Zhuang et al. | 310/87 |
| 2003/0116323 A1 | | 6/2003 | Pettigrew | |
| 2005/0199384 A1 | | 9/2005 | Mack et al. | |
| 2007/0224057 A1 | * | 9/2007 | Swatek et al. | 417/414 |

FOREIGN PATENT DOCUMENTS

GB 2396973 A 7/2004

* cited by examiner

*Primary Examiner*—Burton Mullins
(74) *Attorney, Agent, or Firm*—Kevin Brayton McGoff; James L. Kurka

(57) ABSTRACT

A submersible electric motor in a submersible pump system is provided that facilitates connecting auxiliary tools with the motor and disconnecting auxiliary tools from the motor without draining the fluid from the motor. The motor includes electrical terminals for connecting the auxiliary tool with the motor and may include a hydraulic connector that maintains the fluid in the motor when connecting or disconnecting the auxiliary tool and provides fluid communication of the fluid between the motor and a terminal area when the auxiliary tool is connected.

21 Claims, 9 Drawing Sheets

SUBMERSIBLE ELECTRIC MOTOR TERMINATED FOR AUXILIARY TOOLS

FIELD OF THE INVENTION

The present invention relates in general to submersible electric pumps and in particular to methods and apparatus for terminating electric submersible motors facilitating mechanically integrating other apparatus with electrical and/or hydraulic connections to the motor.

BACKGROUND

Submersible electric pumping systems are utilized in a variety of environments. These submersible pumping systems include a submersible pump driven by a submersible motor. When selecting a prior art fluid-filled submersible motor, the operator typically must initially select whether the motor includes auxiliary tools such as a downhole gauge for temperature or pressure measurements connected at the lower end of the motor. The attachment of auxiliary equipment is best made at the initial stage, before the motor is delivered, due to the requirement of draining the fluid from the prior art electrical motors before adding or replacing auxiliary equipment. The limitations to adding or replacing additional apparatus to electric submersible pumps, in particular in relation to oilfield applications, can be very costly.

Therefore, it is a desire to provide a termination for electric submersible motors that addresses drawbacks of the prior art electric submersible motors. It is a still further desire to provide a termination for fluid-filled, electric submersible motors that facilitates adding or removing auxiliary equipment to the electric motor without requiring draining of fluid from the motor.

SUMMARY OF THE INVENTION

Accordingly, inventive submersible electric motors adapted for connecting or disconnecting auxiliary tools without draining fluid from the electric motors are provided. In one embodiment, a fluid-filled, submersible electric motor adapted for connecting to or disconnecting from an auxiliary tool without draining the fluid from the motor includes a housing containing motor works and the fluid, a base connected to the housing, an electrical connector having terminals extending from the base for electrically connecting the auxiliary tool to the motor and a hydraulic connector providing selective hydraulic communication of the fluid between the housing and a terminal area.

An embodiment of an electric submersible pump system having a fluid-filled, electric motor adapted for connecting to and disconnecting from an auxiliary tool without draining the fluid from the motor is provided. The motor includes a housing containing motor works and the fluid, a base connected to the housing, an electrical connector having terminals extending from the base for electrically connecting the auxiliary tool to the motor, and a two-way flow check mechanism in connection with the base providing fluid communication of the fluid between the housing and a terminal area when one of an auxiliary tool or a protective cap is connected to the base and substantially sealing the fluid in the housing when neither the auxiliary tool nor the protective cap are connected to the base.

An embodiment of a method of attaching an auxiliary tool to a fluid-filled, submersible electric motor without draining the fluid from the motor includes the steps of providing a motor having a fluid-filled housing, a pump connected at one end and a base connected to the other end, an electrical connector having terminals extending from the base, and a hydraulic connector in fluid communication with the fluid in the housing and a terminal area; connecting a protective cap to the base enclosing the terminals, wherein the terminal area is formed between the cap and the base; removing the protective cap; sealing the fluid in the housing when the terminals are not enclosed; connecting the auxiliary tool to the base, wherein the terminal area is formed between the base and the auxiliary tool; and controlling the flow of fluid between the housing and the terminal area.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1:
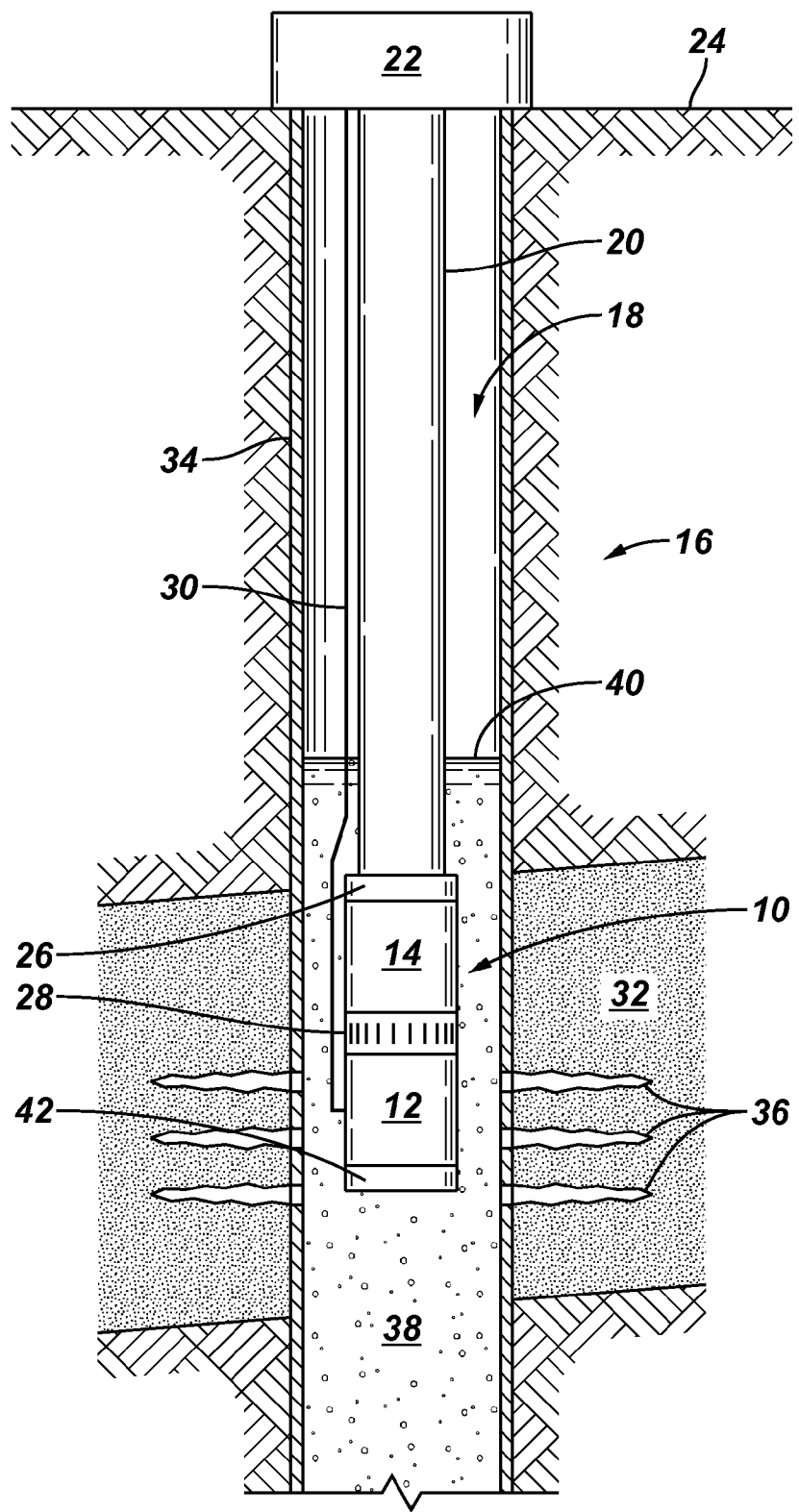
FIG. 1 is a perspective view of an embodiment of a submersible pump system with a terminated electric motor of the present invention deployed in a wellbore.

Refer now to the drawings wherein depicted elements are not necessarily shown to scale and wherein like or similar elements are designated by the same reference numeral through the several views.

As used herein, the terms "up" and "down"; "upper" and "lower"; and other like terms indicating relative positions to a given point or element are utilized to more clearly describe some elements of the embodiments of the invention. Commonly, these terms relate to a reference point as the surface from which drilling operations are initiated as being the top point and the total depth of the well being the lowest point.

FIG. 1 is a perspective view of an embodiment of the terminated system of the present invention, generally denoted by the numeral 10. Terminated system 10 includes an fluid-filled, submersible electric motor 12 that is terminated for connecting or disconnecting auxiliary equipment, such as temperature and pressure gauges, to its terminated end without draining fluid from the motor. Terminated motor 12 is connectable to a submersible pump 14 and serves as the driving mechanism for pump 14.

In the embodiment illustrated in FIG. 1, a submersible pump system 16 is deployed in a wellbore 18 by a deployment system 20, such as production tubing or coiled tubing. However, other types of deployment systems, e.g. cable deployment systems, can be used. Pumping system 16 is suspended from a wellhead 22 by deployment system 20, and a wellbore fluid 38 is produced upwardly to wellhead 22 through the production tubing of deployment system 20. Wellhead 22 is disposed at a surface location, such as at a surface 24 of the earth.

Wellbore 22 is drilled into a formation 32 holding fluid 38, such as oil. Wellbore 22 may be lined with a casing 34 having perforations 36 extending into formation 32. It should be noted that the present system may be utilized to producing fluid from wellbore 22 to surface 24 or utilized for injecting fluid into formation 32.

Electric submersible pumping system 16 includes submersible pump 14 coupled to deployment system 20 by a connector 26. In the production mode, pump 14 and motor 12 are submerged in fluid 38, positioned below the fluid level 40. Fluid is drawn into pump 14 through a pump intake 28. Submersible pump 14 is powered by terminated motor 12 which receives electrical power via power cable 30.

Electric motor 12 is filled with a fluid and has a terminated end 42. Motor 12 is adapted for adding auxiliary apparatus and equipment, such as gauges, without requiring the draining and refilling of motor 12 with fluid. Terminated motor 12 of the present invention provides adaptability not available in previous fluid-filled submersible motors.

Figure 2:
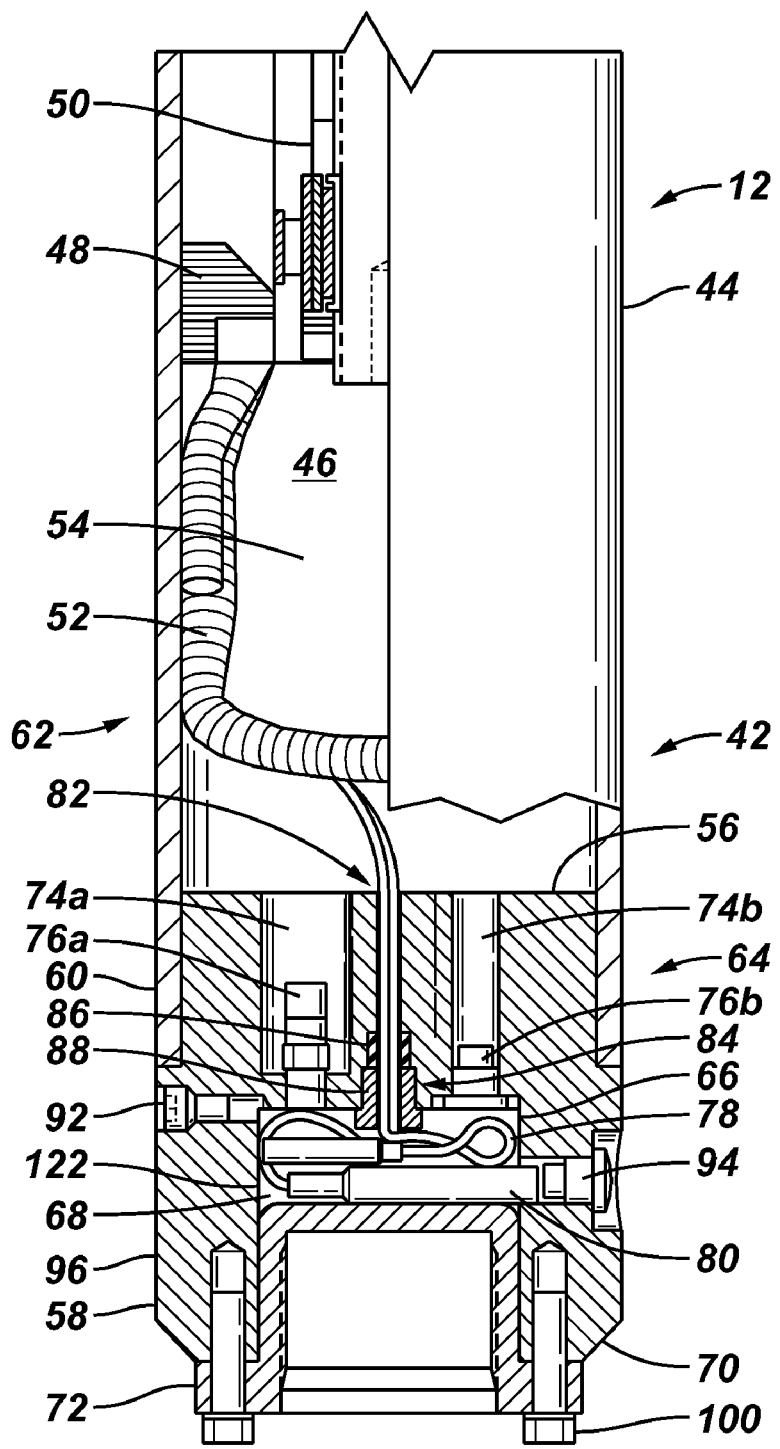
FIG. 2 is a partial cross-sectional view of an embodiment of the terminated motor of the present invention.

FIG. 2 provides a partial cross-sectional view of an embodiment of terminated motor 12 of the present invention. Terminated motor 12 includes a housing 44 forming a motor chamber 46. Disposed within motor chamber 46 are the motor working elements, such as without limitation a stator 48, rotor 50, motor winding 52 and a fluid 54. Fluid 54 may be an oil, or other fluid to serve functions such as lubrication, dielectric, hydraulic and heat transfer. The working elements of motor 12 are well known in the art and common with the prior art, fluid-filled submersible electric motors.

Terminated end 42 (FIG. 1) of motor 12 includes a base 58. Base 58 includes a first base end 56 and a connection end 66. Base 58 is physically connected to housing 44 for mechanically connecting auxiliary tools to motor 12 and operationally connecting the auxiliary tool to the working elements of motor 12. Base 58 may be connected to housing 44 in various manners, such as without limitation welding, threading or bolting. As shown in FIG. 2, base 58 is connected via threading to housing extension 60.

Base 58 includes a hydraulic connector 62 and an electrical connector 64 for operationally connecting the auxiliary tool to motor 12. In one embodiment, connection end 66 is positioned in a recess 68 formed in base 58 from the distal end 70 of base 58 from motor 12. A cap 72 is connectable to distal end 70 to seal and protect hydraulic and electrical connectors 62, 64 when an auxiliary tool is not connected.

Hydraulic connector 62 includes at least one hydraulic channel 74 in fluid connection with a flow control valve or hydraulic two-way check mechanism 76. Hydraulic two-way check mechanism 76 provides hydraulic communication between motor chamber 46 and terminal area 122, proximate connection end 66 of base 58. Hydraulic two-way check mechanism 76 maintains the sealed status of motor 12 when cap 72 or auxiliary tool 98 (FIG. 3) are absent.

In the embodiment illustrated, hydraulic connector 62 includes a first hydraulic channel 74a and a second hydraulic channel 74b, each channel having a respective check mechanism 76a, 76b comprising hydraulic two-way check mechanism 76. First check valve 76a allows fluid 54 to flow from motor chamber 46 (motor side) through first base end 56 and channel 74a to the lower side of connection end 66 of base 58. The cracking pressure for first check valve 76a can be set to a certain level, for example, 30 psi. First check valve 76a releases fluid 54 from the motor side when the pressure in motor chamber 46 is greater by the certain level, i.e. 30 psi, than the lower side of base 58. Second check valve 76b permits fluid 54 to flow from the lower side of base 58 (terminal area 122) into motor chamber 46. Second check valve 76b is set with a cracking pressure, for example 10 psi, such that valve 76b opens when pressure at terminal area 122 is 10 psi greater than in motor chamber 46. Note that terminal area 122 is the lower side of base 58 that is defined by the connection of cap 72 or auxiliary tool 98.

It is further noted, that two-way check mechanism 76 may comprise a single valve. For example, a shuttle valve that is spring-biased at two sides with the same or different biasing force (pressure) may be utilized.

During operation or transportation, the pressure in motor chamber 46 and the lower side (connection end 66) of base 58 may vary due to thermal expansion and contraction of fluid 54. The pressure differential may then open two-way check mechanism 76. Two-way check mechanism 76 substantially equalizes pressure between motor 12 and terminal area 122.

Electrical connector 64 includes electrical wires 78 connected with motor winding 52 and having terminals 80 positioned past connection end 66 for connecting with the auxiliary tool. Electrical wires 78 are routed through a conduit 82 formed through base 58. Electrical connector 64 further includes a sealing or electrical penetration mechanism 84 to seal motor chamber 46 from the exterior of base 58 through conduit 82. In the illustrated embodiment, seal mechanism 84 includes a grommet 86 positioned about wires 78 in conduit 82. Seal mechanism 84 may further include a nut 88 and washer 90 in connection with base 58 and grommet 86 to energize seal member 86.

Figure 3:
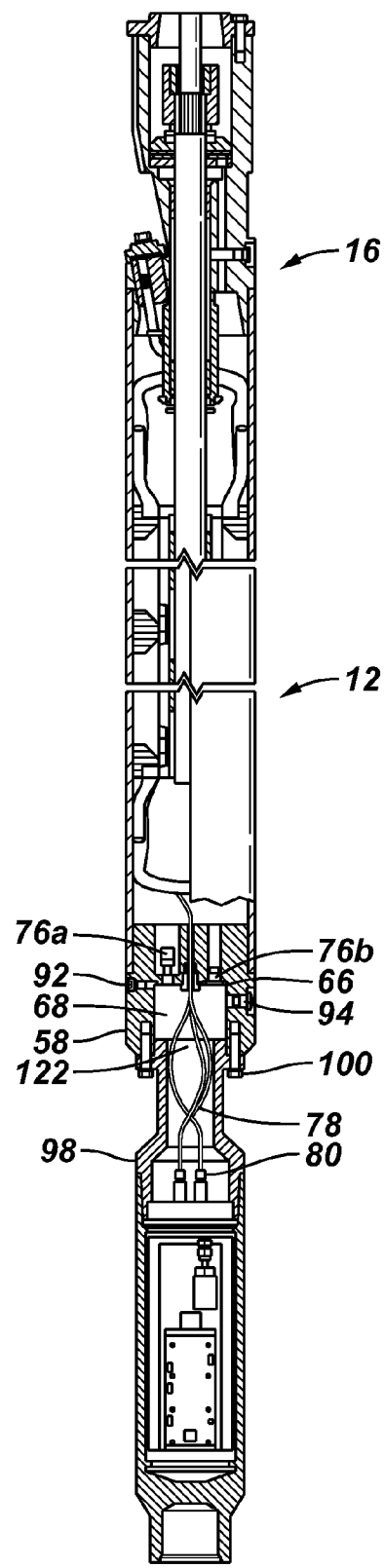
FIG. 3 is a partial cross-section view of an embodiment of an auxiliary tool connected to the motor of FIG. 2.

Base 58 may further include a vent plug 92 and/or an fluid valve 94 further described in relation to FIG. 3. Vent plug 92 includes a conduit formed from the side wall 96 of base 58 to the interior of base 58 shown as recess 68 or terminal area 122 defined by base 58 and either cap 72 or auxiliary tool 98.

FIG. 3 is a partial cross-section view of an embodiment of an auxiliary tool 98 connected to motor 12 of FIG. 2. With reference to FIG. 2, cap 72 is removed from base 58, in this embodiment by removing bolts 100. Removal of cap 72 reveals recess 68 and electrical terminals 80. The cracking pressure of two-way check valve mechanism 76 is set at a level so that fluid 54 does not flow from motor chamber 46. Electrical wires 78 are extended and electrical terminals are connected to auxiliary tool 98. In this embodiment, auxiliary tool 98 is a temperature and pressure gauge, however, other tools may be connected. Auxiliary tool 98 is then connected to base 58 in a manner to form a fluid seal across connecting end 66.

As is apparent from the description of the invention with reference to FIGS. 2 and 3, it is not necessary to drain fluid 54 from a pre-filled motor 12. Thus, it is not necessary to fill motor 12 with fluid 54 after installation of auxiliary tool 98.

Fluid 54 may be filled in recess 68, or the relatively small area represented by recess 68 between base 58 and auxiliary tool 98 (terminal area 122) via fill mechanism 94. Fill mechanism 94 in the illustrated embodiment includes a conduit through base 58 to housing 44 and a valve. As illustrated, vent 92 and fill valve 94 are provided in conjunction to ensure proper filling and to facilitate filling terminal area 122 with motor 12 in the vertical position (for example as oriented in FIG. 1) or in a horizontal position. For example, with motor 12 laid horizontally, vent 92 is oriented up with the plug removed. Fluid may then be filled through valve 94 until the fluid shows at vent 92.

It may be desired to fill motor 12 with fluid 54, for example when motor 12 is shipped without fluid or filling motor 12 after loss of fluid 54 during operation of pump system 16. To fill motor 12, with either auxiliary tool 98 or cap 72 connected to base 58, fluid 54 is injected through fill mechanism 94 overcoming the cracking pressure of two-way check mechanism 76 permitting flow of fluid 54 into motor chamber 46.

Figure 4:
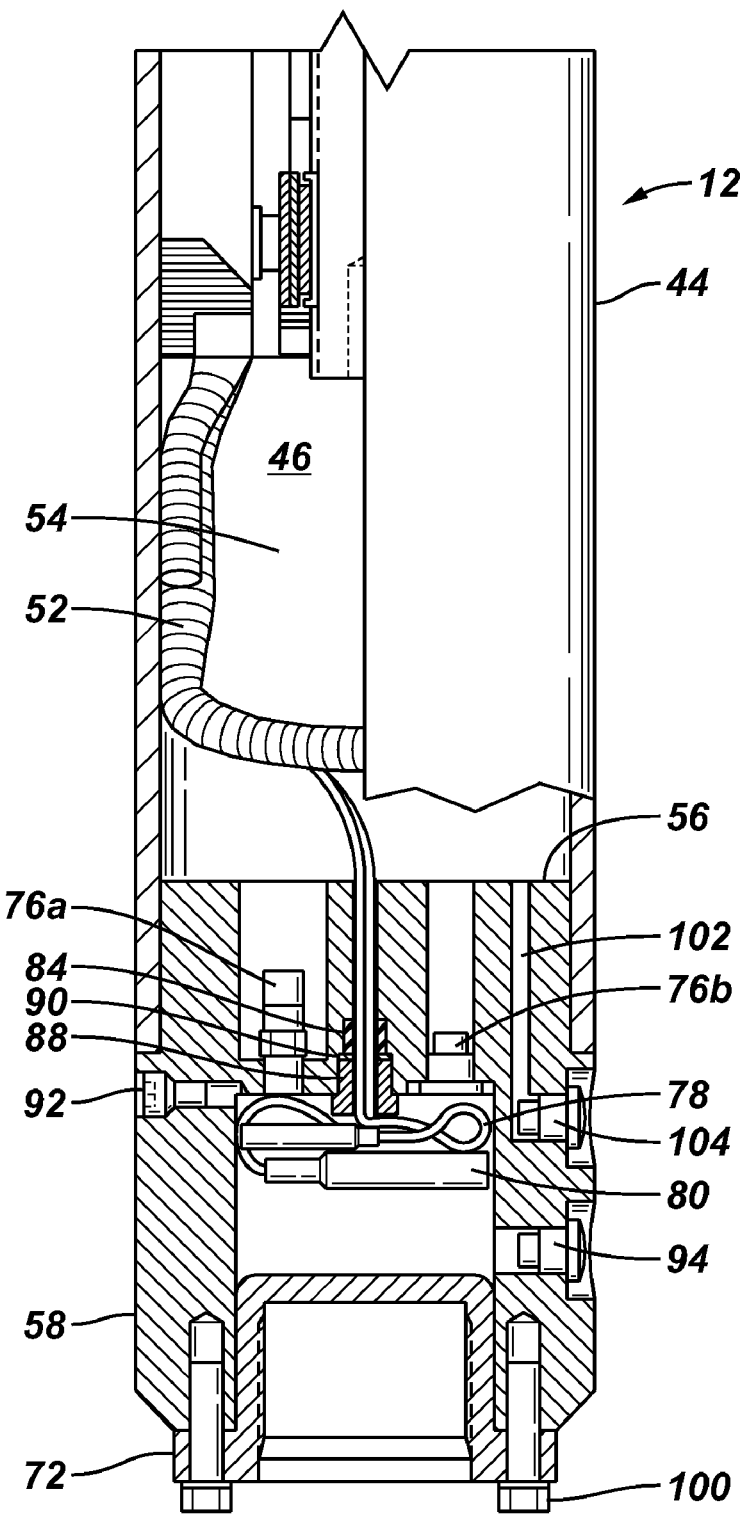
FIG. 4 is an illustration of an embodiment of the inventive base providing an optional mechanism for filling the motor with fluid.

It may further be desired to fill motor chamber 46 directly with fluid 54 when needed. Referring to FIG. 4, a motor fill mechanism for directly filing motor chamber 46 of motor 12 is illustrated. In this embodiment, the motor fill mechanism includes a motor fill channel 102 formed from chamber 46, through first base end 56 terminating through valve 104 at side wall 96.

Figure 5:
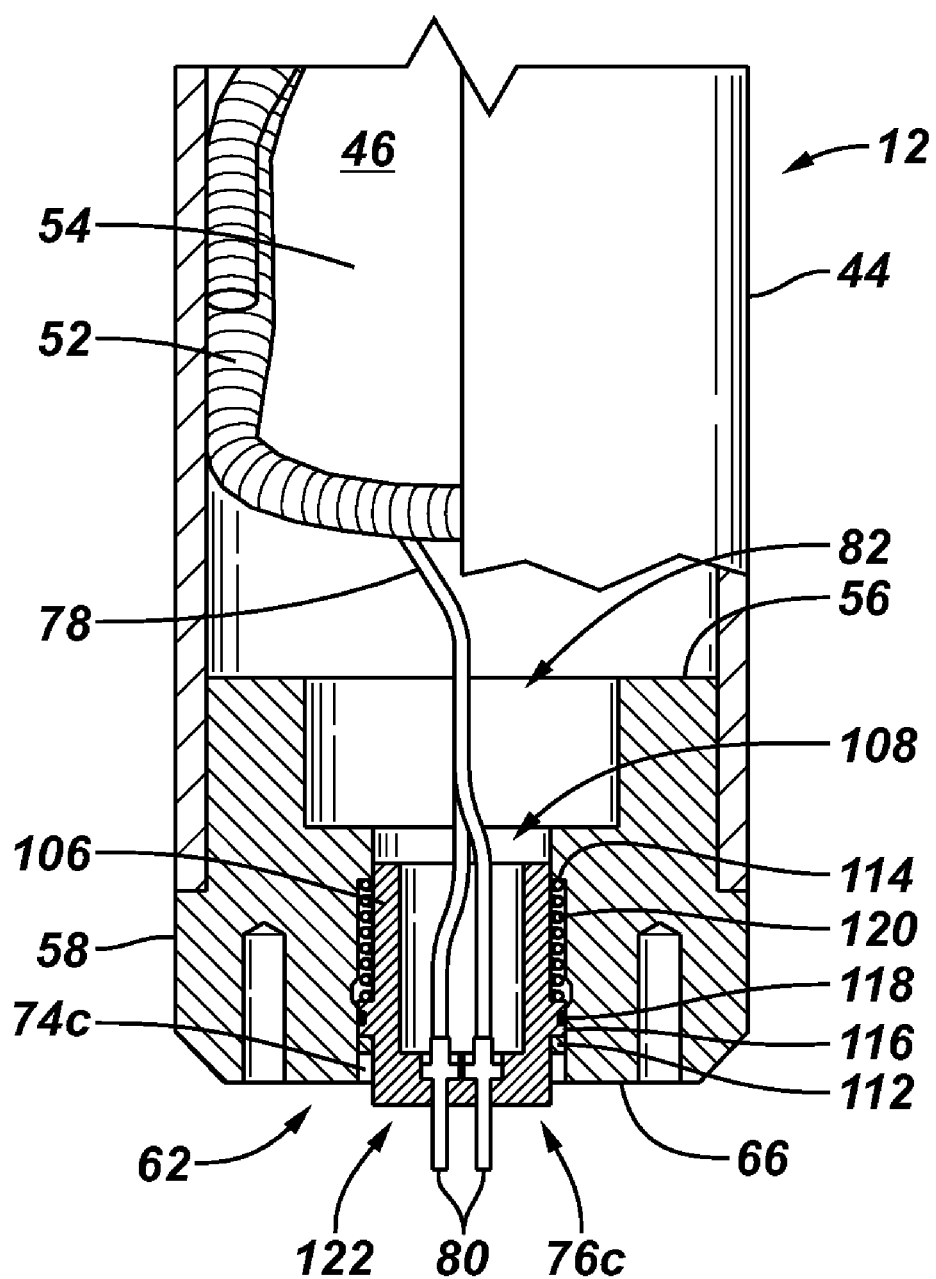
FIGS. 5-7 are a partial cross-section views of another embodiment of the motor of the present invention.
Figure 6:
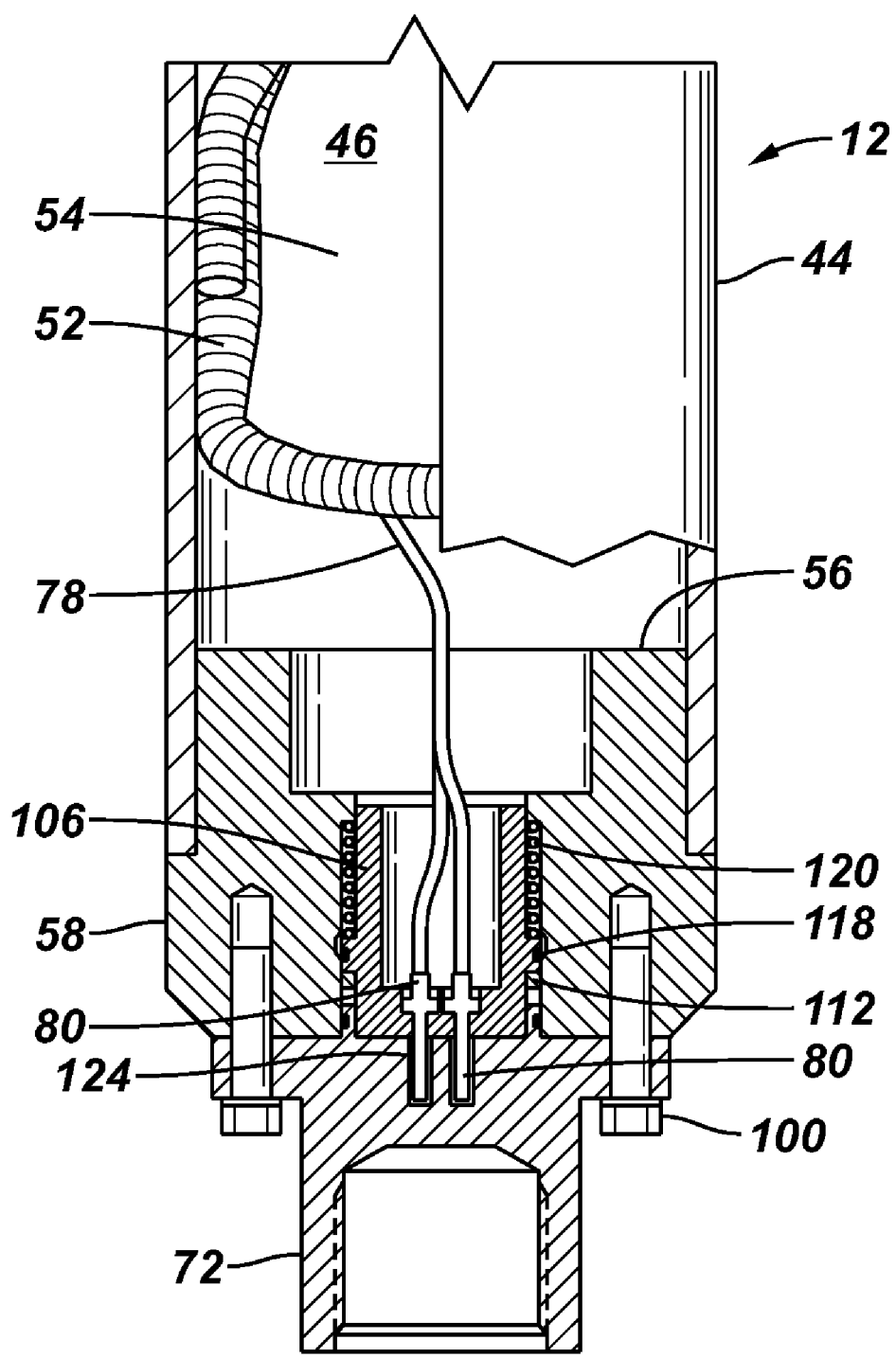
Figure 7:
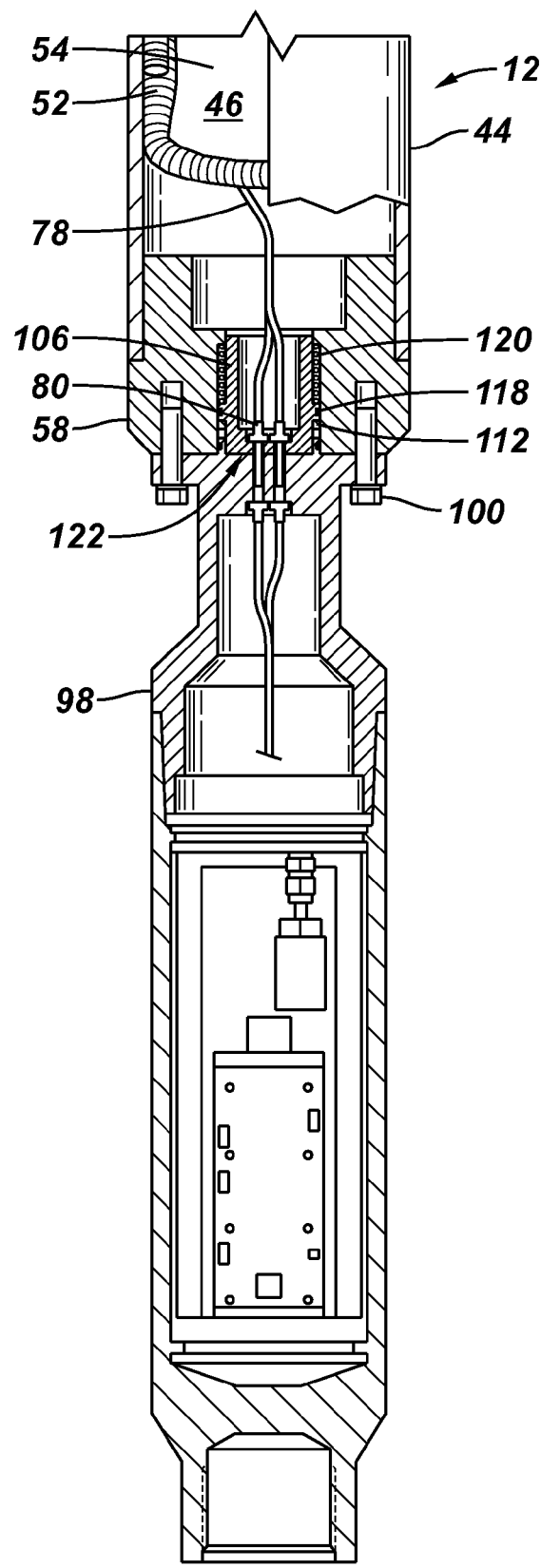

Refer now to FIGS. 5, 6 and 7 wherein another embodiment of motor 12 is provided. In this embodiment, two-way hydraulic valve mechanism 76c includes a floating block 106 moveably, and selectively sealingly, positioned within hydraulic channel 74c. Hydraulic channel 74c is formed through base 58 between connection end 66 and first base end 56. Block 106 is moveable between a sealed position (FIG. 5) and an unsealed position (FIGS. 6 and 7).

Electrical connector 64 between auxiliary tool 98 (FIG. 7) and motor 12 is provided by electrical wires 78 and electrical terminals 80. Electrical wires extend from motor windings 52 through conduit 82 formed through first base end 56. Electrical terminals 80 extend from block 106 toward connection end 66. A terminal area 122 is shown generally in FIGS. 5 through 7 as the area around terminals 80 exterior of block 106 and proximate connection end 66 of base 58.

Channel 74c extends from connection end 66 to an upper end 108. A groove 110 is formed in base 58 circumferentially about channel 74c. A stop 112, such as a ring, is connected to base 58 within channel 74c between connection end 66 and groove 110. A shoulder 114 projects from base 58 into channel 74c between upper end 108 and groove 110. Formed on the outer wall of block 106 is a projection 116 carrying a sealing member 118, such as an O-ring. Two-way valve mechanism 76c further includes an biasing mechanism 120, such as a spring.

Block 106 is disposed within channel 74c with projection 116 positioned between stop 112 and shoulder 114. Biasing mechanism 120 is positioned in connection between shoulder 114 and projection 116 so as to bias block 106 toward connection end 66. Stop 112 and projection 116 limit movement of block 106 toward connection end 66.

In the sealed position, shown in FIG. 5, seal 118 is positioned between groove 110 and stop 112 thus blocking flow of fluid 54 through channel 74c between block 106 and base 58. Fluid 54 is disposed in motor chamber 46 and is in fluid connection with base 58, for example through conduit 82 through first base end 56.

Referring to FIG. 7, auxiliary tool 98 is connected to base 58 and electrical terminals 80. Auxiliary tool 98 contacts block 106 urging it against biasing mechanism 120 positioning seal member 118 into groove 110, thus block 106 is in the unsealed position. In the unsealed position, fluid 54 can pass through channel 74c equalizing the pressure between motor 12 and terminal area 122.

Referring back to FIG. 6, motor 12 is shown with cap 72 connected to protect terminals 80. Cap 72 may include terminal recesses 124 for disposing terminals 80. It may be desired that cap 72 urge block 106 into the unsealed position, or allow block 106 to rest in the sealed position.

An example of a method of attaching auxiliary tool 98 is described with reference to FIGS. 5 through 7. In FIG. 6, motor 12, pre-filled with fluid 54 is delivered from a supplier without an auxiliary tool 98 and having a protective cap 72 in place. An operator removes cap 72 so that an auxiliary tool 98 may be connected. With cap 72 removed, block 106 is in the sealed position as shown in FIG. 5. In the sealed position, fluid 54 is not drained or lost from motor 12. The operator then connects electrical terminals 80 with tool 98 and connects tool 98 to base 58 via bolts 100. Tool 98 contacts block 106 and urges it against biasing mechanism 120 moving seal 118 into groove 110, positioning block 106 in the unsealed position. With block 106 in the unsealed position, fluid 54 can communicate between motor 12 and terminal area 122 thus equalizing the pressure. It is noted, that by selection of the spring constant of biasing mechanism 120 and/or varying surface areas of the faces of block 106, the cracking or unsealing pressure can be adjusted to facilitate the flow direction of fluid 54 between housing 44 and terminal area 122.

Figure 8:
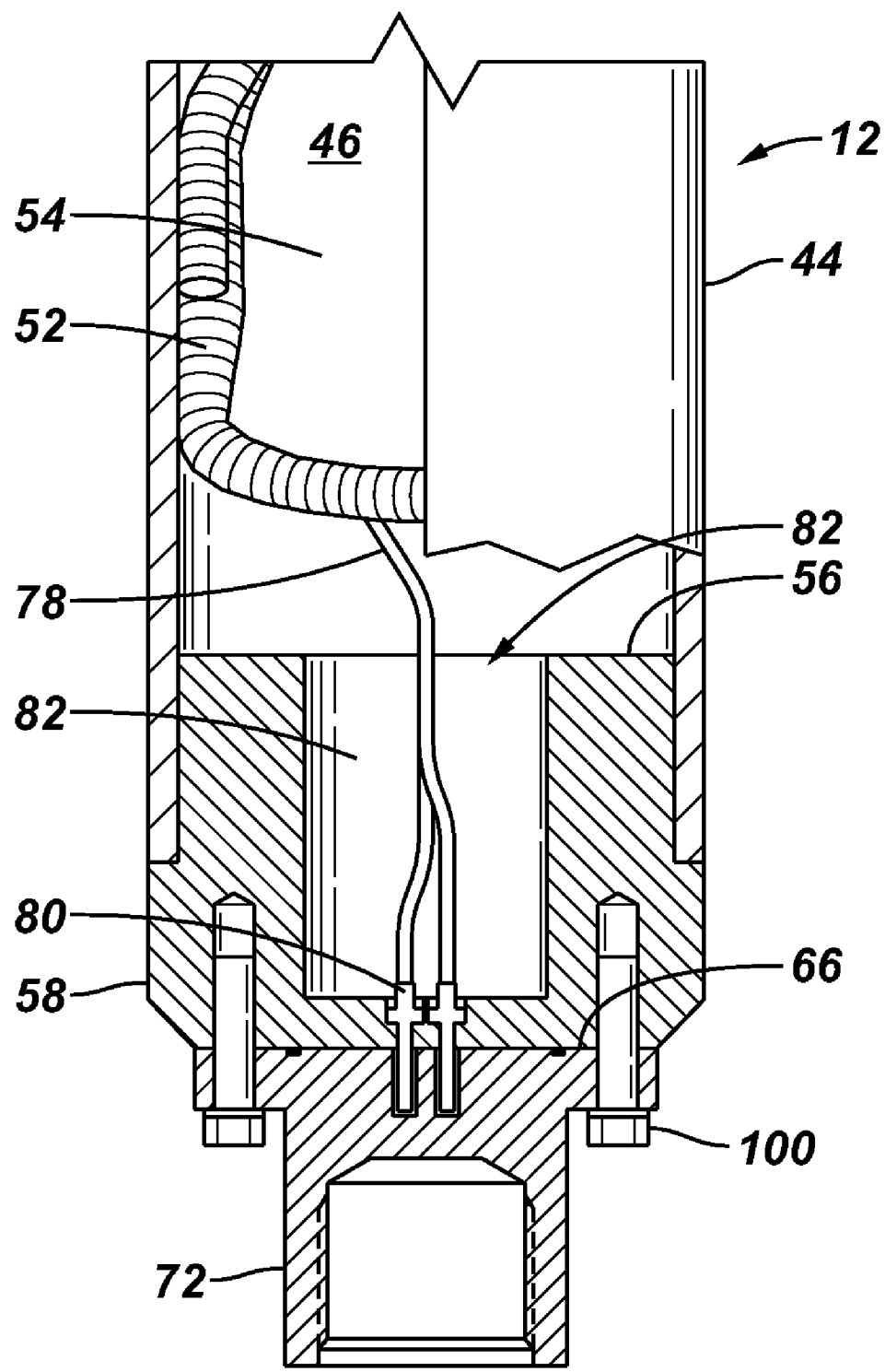
FIG. 8 is a partial cross-sectional view of a still further embodiment.

FIG. 8 is a partial cross-sectional view of another embodiment of a motor 12 of the present invention. In this embodiment, base 58 forms an enclosed recess between connection end 66 and first base end 56 of base 58. In this embodiment, electrical terminals 80 penetrate the substantially flat connection end 66 of base 58. In this embodiment, when the auxiliary tool (not shown) is connected to base 58, there is virtually no void between connection end 66 and the connected tool, thus there is no need to equalize the pressure of the terminal area and the motor.

Figure 9:
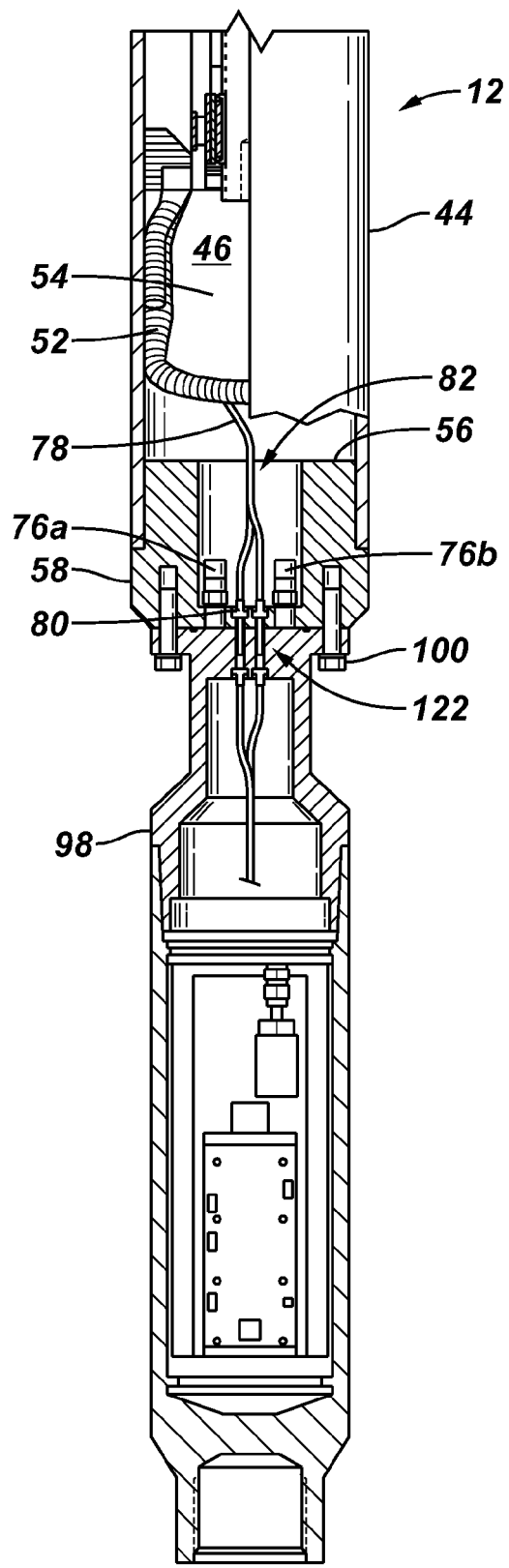
FIG. 9 is a partial cross-sectional view of another embodiment of terminate motor of the present invention.

FIG. 9 is a partial cross-sectional view of still further embodiment of motor 12 of FIG. 8. In this embodiment, a two-way check mechanism 76, comprising a first check valve 76a and a second check valve 76b, is provided to balance the pressure between terminal area 122 and motor chamber 46. Operation of two-way check mechanism 76 is described above with reference to FIGS. 2 and 3.

From the foregoing detailed description of specific embodiments of the invention, it should be apparent that a method and system for terminating a fluid-filled electric motor to facilitate adding and removing auxiliary equipment without draining fluid from the motor that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A fluid-filled, submersible electric motor adapted for connecting to and disconnecting from an auxiliary tool without draining the fluid from the motor, the motor comprising:
  a housing containing motor works and the fluid;
  a base connected to the housing;
  an electrical connector having terminals extending from the base for electrically connecting the auxiliary tool to the motor; and
  a hydraulic connector providing selective hydraulic communication of the fluid between the housing and a terminal area.

2. The motor of claim 1, further including an electrical penetration sealing mechanism connected to the electrical connector.

3. The motor of claim 1, wherein the hydraulic connector seals the fluid in the housing when neither a cap nor the auxiliary tool is connected to the base and facilitates hydraulic communication between the housing and the terminal area.

4. The motor of claim 1, wherein the hydraulic connector allows hydraulic communication of the fluid between the housing and terminal area when a selected pressure differential is met between the housing and the terminal area.

5. The motor of claim 1, wherein the hydraulic connector substantially equalizes the pressure between the housing and the terminal area.

6. The motor of claim 1, further including a fill mechanism for disposing a fluid into the terminal area.

7. The motor of claim 1, further including a motor fill mechanism positioned through the base adding the fluid to the housing.

8. The motor of claim 1, wherein the hydraulic connector comprises one valve positioned in the base in fluid communication between the housing and the terminal area.

9. The motor of claim 8, wherein the one valve provides fluid flow in both directions between the housing and the terminal area.

10. The motor of claim 8, further including a fill mechanism for disposing a fluid into the terminal area.

11. The motor of claim 8, wherein the terminals are connected to the one valve.

12. The motor of claim 1, wherein the hydraulic connection includes:
 a first valve permitting flow of the fluid from the housing to the terminal area when a first selected differential pressure is met; and
 a second valve permitting flow of the fluid from the terminal area to the housing when a second selected differential pressure is met.

13. An electric submersible pump system having a fluid-filled, electric motor adapted for connecting to and disconnecting from an auxiliary tool without draining the fluid from the motor, the motor comprising:
 a housing containing motor works and the fluid;
 a base connected to the housing;
 an electrical connector having terminals extending from the base for electrically connecting the auxiliary tool to the motor; and
 a two-way flow check mechanism in connection with the base providing fluid communication of the fluid between the housing and a terminal area when one of an auxiliary tool or a protective cap is connected to the base and substantially sealing the fluid in the housing when neither the auxiliary tool nor the protective cap are connected to the base.

14. The motor of claim 13, wherein the two-way flow check mechanism comprises a single valve.

15. The motor of claim 14, wherein the single valve comprises a floating block moveably positioned within a channel formed through the base.

16. The motor of claim 15, wherein the terminals are connected to the floating block.

17. The motor of claim 13, wherein the hydraulic connection includes:
 a first valve permitting flow of the fluid from the housing to the terminal area when a first selected differential pressure is met; and
 a second valve permitting flow of the fluid from the terminal area to the housing when a second selected differential pressure is met.

18. A method of attaching an auxiliary tool to a fluid-filled, submersible electric motor without draining the fluid from the motor, the method comprising the steps of:
 providing a motor having a fluid-filled housing, a pump connected to one end of the motor and a base connected to the other end of the motor, an electrical connector having terminals extending from the base, and a hydraulic connector in fluid communication with the fluid in the housing and a terminal area;
 connecting a protective cap to the base enclosing the terminals, wherein the terminal area is formed between the cap and the base;
 removing the protective cap;
 sealing the fluid in the housing when the terminals are not enclosed;
 connecting the auxiliary tool to the base, wherein the terminal area is formed between the base and the auxiliary tool; and
 controlling the flow of fluid between the housing and the terminal area.

19. The method of claim 18, wherein the controlling step includes:
 permitting the flow of the fluid from the housing to the terminal area when a first selected differential pressure is met; and
 permitting the flow of fluid from the terminal area to the housing when a second selected differential pressure is met.

20. The method of claim 18, further including the step of filling the terminal area with a fluid.

21. An electric submersible pump system having a fluid-filled, electric motor adapted for connecting to and disconnecting from an auxiliary tool without draining the fluid from the motor, the motor comprising:
 a housing containing motor works and the fluid;
 a base connected to the housing; and
 a two-way flow check mechanism in connection with the base providing fluid communication of the fluid between the housing and a terminal area when one of an auxiliary tool or a protective cap is connected to the base and substantially sealing the fluid in the housing when neither the auxiliary tool nor the protective cap are connected to the base.

* * * * *